United States Patent
Davy et al.

(10) Patent No.: US 6,665,275 B1
(45) Date of Patent: Dec. 16, 2003

(54) NETWORK DEVICE INCLUDING AUTOMATIC DETECTION OF DUPLEX MISMATCH

(75) Inventors: Andrew M Davy, Herpenden (GB); Andrew P White, St Albans (GB); David E Bill, St Albans (GB); David Kirby, Hemel Hempstead (GB); Stephen N Crocombe, Dunstable (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/453,720

(22) Filed: Dec. 3, 1999

(30) Foreign Application Priority Data

Oct. 13, 1999 (GB) .............................. 9924116

(51) Int. Cl.$^7$ ................................ H04B 1/44
(52) U.S. Cl. ................ 370/282; 370/296; 370/445; 370/449; 709/220; 709/227
(58) Field of Search ............... 370/230, 235, 370/389, 437, 445, 447, 448; 709/220, 227

(56) References Cited

U.S. PATENT DOCUMENTS 5,121,382 A * 6/1992 Yang et al. ............... 370/250
5,825,755 A   10/1998 Thompson et al.
6,023,472 A * 2/2000 Kupchik et al. ........... 370/446

FOREIGN PATENT DOCUMENTS

EP  0 422 914 A3  4/1991
EP  0 869 643 A2  10/1998

* cited by examiner

*Primary Examiner*—Hassan Kizou
*Assistant Examiner*—David Odland
(74) *Attorney, Agent, or Firm*—Nixon & Vanderhye, PC

(57) ABSTRACT

A network device which is for use in an Ethernet packet-based communication system has at least one port which is capable of auto-negotiation to select between half duplex and full duplex working on a link to which the port is connected. The device includes means for monitoring the existence of late collisions between packets on said link, means for monitoring the existence of packet fragments on the link, and monitoring means for detecting and correcting for a duplex mismatch on the link partner. This monitoring means is operative to determine whether there are any late collisions and in the absence of a detection of fragments to configure the port from a half duplex mode to a full duplex mode. The monitoring means is also operative to detect the presence of fragments when the port is in full duplex mode and thereby to provide an indication that a rule relating to network size is infringed.

4 Claims, 2 Drawing Sheets

NETWORK DEVICE INCLUDING AUTOMATIC DETECTION OF DUPLEX MISMATCH

FIELD OF THE INVENTION

The present invention relates to devices for use in a packet-based data communication system and particularly to such devices for use in an Ethernet network wherein the packets conform to relevant standards prescribing criteria for 'collisions' between packets. The invention also relates to devices which are capable of auto-negotiation according to relevant standards. The invention has particular relevance to circumstances wherein a port which is capable of auto-negotiation to establish duplex working does not complete the exchange of information necessary to select between full duplex and half duplex working.

BACKGROUND TO THE INVENTION

The development of packet-based communication networks such as Ethernet networks and particularly the development of different transmission rates and, also, the need for network devices at respective ends of a communication link to exchange information has led to the establishment of a process known as auto-negotiation, which allows a device to advertise those modes of operation that it possesses to a device at the remote end of a link and to detect, in reply, corresponding operational modes. The general object of auto-negotiation is to provide the means to exchange information between the devices that share each segment and to enable the automatic configuration of both devices to take maximum advantage of the abilities that they have in common. Auto-negotiation is preferably performed according to IEEE Standard, 802.3 (1998 Edition;) using a modified 10 BASE-T link integrity test pulse sequence, as fully described in Clause 28 of that Standard. The function allows the devices to reject the use of operational modes that are not shared by both devices. Where more than one common mode exists between the two devices, auto-negotiation allows the devices to resolve to a single mode of operation using a predetermined sequence using auto-negotiation state machines, which are prescribed to be at the physical layer link of the OSI reference model.

The information about modes of operation supported by the device's physical layer (PHY) is held in a defined register, which is, for example, defined in Clause 22 of the aforementioned 802.3 Standard Basically, the register has certain bits that represent, for example, whether the device has a full duplex ability at a particular format. For example, the device may have full duplex ability for 100 BASE-X, 100 BASE-T2 and 10 Megabits per second and, if so, the relevant bits will be set in the defined register. If any one of those full duplex abilities are not supported by the device's PHY, the relevant bit in the respective register is not set and the relevant ability will not be advertised by the devices auto-negotiation process. If the link partners, namely the devices at each end of a link, are both enabled to perform auto-negotiation, there will not be any mismatch of abilities between the link partners. However, a device which is operational to perform auto-negotiation may have a link partner which might either be not capable of auto-negotiation or be so capable but disabled in this respect. Under the circumstances the link may still be established but there can be a mismatch between the abilities of the link partners and in particular a mismatch between half duplex and full duplex working.

The present invention is therefore particularly concerned with improving the operation of a device which has at least one (and normally more than one) port which is capable of auto-negotiation and to render that port capable of detecting and correcting a duplex mismatch, on the assumption that a valid communication link has been made to the port and that a selection between half duplex and full duplex working by auto-negotiation has not been made for the link.

If there is a duplex mismatch on an Ethernet connection the full duplex end will transmit whenever it has a packet to send. It will not monitor the link to see whether it is busy or not. Consequently, unnecessary collisions will be caused when the full duplex end transmits when the half duplex end is already transmitting. The half duplex end will detect the collisions and will re-transmit. However, the full duplex end will not be expecting a collision (which does not occur in full duplex working) and will be unaware that the packet which is in the collision and sent to the half duplex end will have been discarded by the half duplex end. Furthermore, since a duplex connection is an aggressive transmitter, the connection will be susceptible to a 'capture effect' in which the full duplex end disproportionately dominates the link.

'Collisions' and 'late collisions' are standard Ethernet events that are monitored by all Ethernet devices that provide network management of some description. They are both defined in the Ethernet standard. A collision occurs when two Ethernet devices transmit simultaneously and is a normal occurrence on a half duplex Ethernet network. On a half duplex network a device should not transmit if it is receiving data from another device, however due to propagation delay it is possible for two devices to attempt to transmit simultaneously, each device eventually receiving the other packet, this represents a collision. The Standards define a 'collision' as an interfering signal that occurs within some predetermined time (currently 64 bytes or 512 bits) from the start of the packet. If the collision is detected after a predetermined time from the start of a packet transmission (currently after the first 512 bits) then it is deemed to be a 'late collision'. It normally occurs in an oversize network.

A 'fragment' is a result of a collision and is also monitored by Ethernet devices and defined by the Ethernet standard. When a collision is detected by a half duplex device that is transmitting, it will immediately stop transmitting the packet. So for a normal collision this will be within 512 bits (or 64 bytes) of the start of the packet. As the packet transmission is not completed the packet will not contain the CRC error checking data that is at the end of every Ethernet packet. Therefore the definition of a fragment is a packet that is shorter than the defined collision window (e.g. 512 bits) and does not have valid CRC data.

SUMMARY OF THE INVENTION

The invention is based on the detection of the mismatch by monitoring the occurrence of 'late collisions', if the number of such late collisions or the rate thereof exceeds a threshold a decision algorithm is triggered. The existence of late collisions indicates either a duplex mismatch or that the rules for a network size have been broken. According to the invention it is possible to distinguish between the two possible causes by examination of the fragments seen oil the port. If the far end of the link is operating at full duplex, then there will be no fragment seen because the other end will not detect any collision and will continue transmitting, so that the half duplex port should always receive a full packet. If the cause is infringement of the network rules, then the half duplex port will receive fragments A preferred manner of operation according to the invention is to monitor for late collisions in the absence of fragments to detect a duplex mismatch and to cause reconfiguration of a half duplex port to a full duplex port if there be a duplex mismatch. Preferably there is continued monitoring for fragments so that if fragments are still detected then it will be known that an error has been made and the connection should revert to half duplex, since the cause of the fragments must be an infringement of network rules.

Further objects and features of the invention will be apparent from the description that follows by way of example.

DETAILED DESCRIPTION

Figure 1:
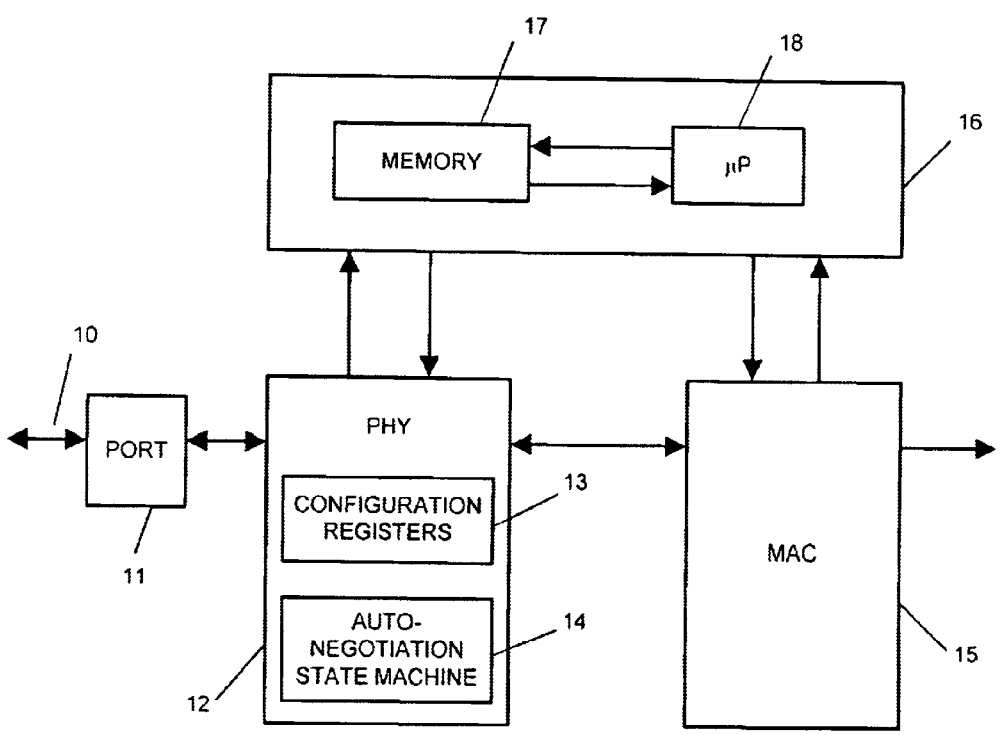
FIG. 1 illustrates in schematic form the features of a network device relevant to a port which is capable of half duplex and full duplex working over a link.

FIG. 1 of the drawings illustrates in schematic form the features of a network device relevant to a port which is capable of half duplex and full duplex working over a link. The individual parts of the device as shown in FIG. 1 will not be described in detail because such are generally known in the art and are fully described in, for example, the aforementioned Standard.

Briefly however FIG. 1 illustrates schematically a link 10 to which a port 11 capable of half duplex and full duplex working selectively is connected. The port is coupled to a physical layer (PHY) 12. This includes, as may be derived from the aforementioned Standard, various configuration registers 13 which are used both to advertise the abilities of the port and to determine the operational mode of the port as the result of an auto-negotiation process performed by an auto-negotiation state machine 14.

The PHY 12 is coupled to a media access controller 15. This likewise is preferably organised in accordance with the aforementioned Standard.

Current media access controllers in response to the signals conveyed to them by way of a PHY 12 are capable of detecting collisions, late collisions and fragments. Normally, media access controllers are defined in terms of a procedural model and may be implemented in any appropriate technology including hardware, firmware, software or any combination thereof.

Mainly for convenience, FIG. 1 illustrates a processor 16 including memory 17 (for the storage of software) and a microprocessor 18. It should be understood that this representation is purely for convenience. Processor 16 may form part of the media access controller 15, it may be implemented in hardware as a suitable ASIC (application-specific-integrated circuit) or may if desired be performed remotely by some suitable network management entity. It is presumed that the media access controller already includes provision for the detection of collisions, late collisions and fragments.

The improvement which constitutes the present invention is described in terms of a flow diagram, following the manner in which a procedural model is described in the relevant Standards, such as for example pages 48 to 52 of IEEE Standard 802.3, 1998 Edition. It is, as previously noted, readily possible to implement the flow diagram in terms of hardware, software, firmware or a combination of all three and the terms 'means' are intended to be understood accordingly.

Figure 2:
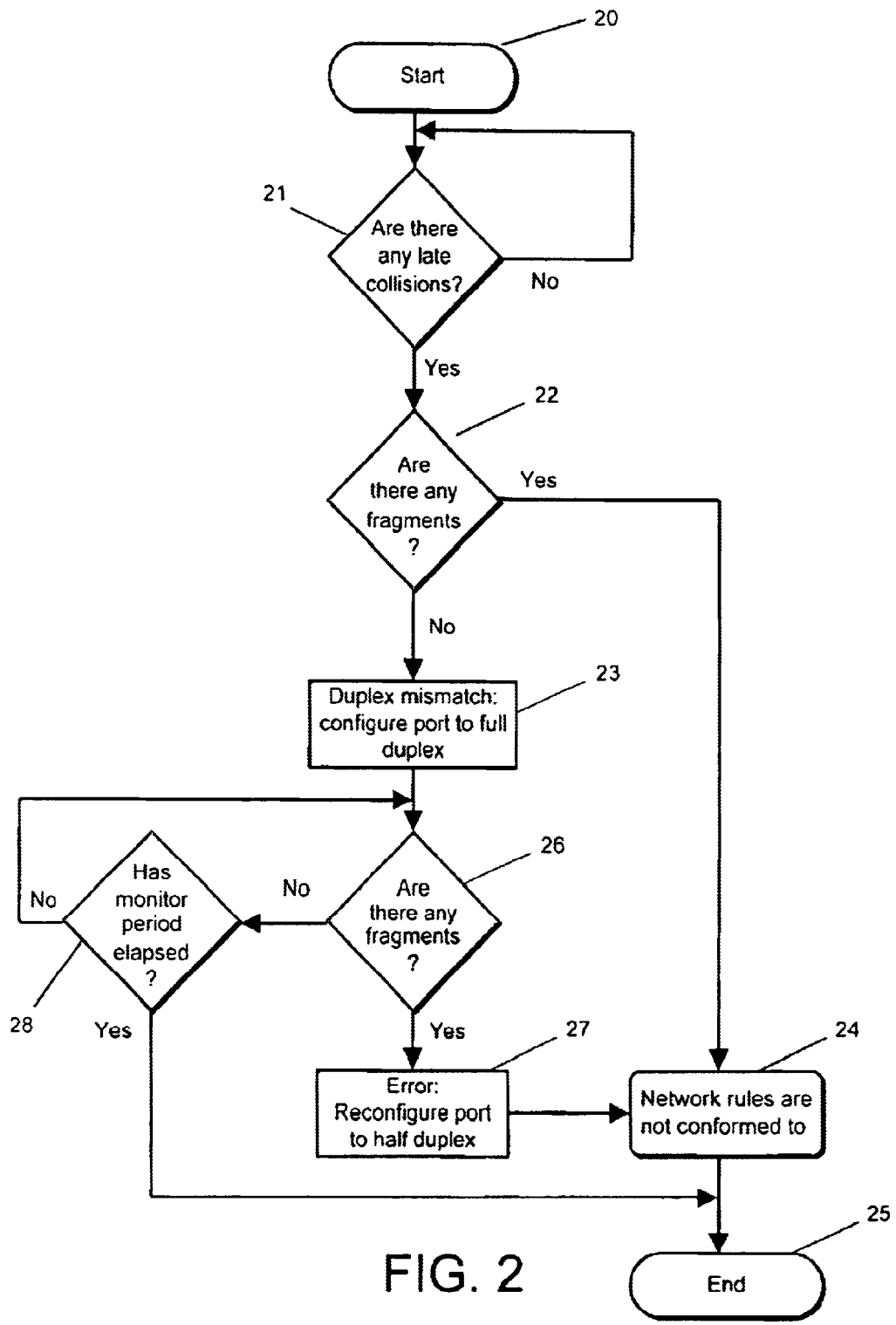
FIG. 2 is a flow diagram illustrating the mismatch detection and correct process according to the invention.

The procedural model shown in FIG. 2 therefore relies on appropriate indications from the late collision detection and the fragment detection in a known form of media access controller and will produce appropriate controls for the PHY and in particular signals for the relevant configuration register.

The program start is denoted by the start box 20 and the first stage in the detection process is a determination whether any late collisions have been detected (stage 21). If no late collision is detected, then it is deemed that no duplex mismatch has occurred and the program reverts to the start stage.

If there has been detection of late collisions, the next decision stage 22 is whether there are any fragments, as previously defined.

If there is no detected fragment, the cause of the late collisions is deemed to be a mismatch between half duplex working on the auto-negotiation port and full duplex operation on the link partner. Therefore the monitored port needs to be configured from its default setting of half duplex to full duplex, as shown by stage 23.

However, fragments are detected as well as late collisions, then the network rules are not obeyed, stage 24, and the mismatch cannot be satisfactorily resolved by reconfiguration. Occurrence of stage 24 may be signalled in any convenient manner.

If the port has been reconfigured to full duplex, the program again monitors (stage 26) to determine whether there are any fragments. Again, if fragments exist, then the port must be reconfigured (stage 27) to half duplex working since the network rules are not obeyed. If there is no fragment detected at this stage the program prescribes the continuance of monitoring for a specified period. If that period has elapsed (stage 28) and there are still no fragments then the reconfiguration is successful.

What is claimed is:

1. A network device which is for use in an ethernet packet-based communication system and has at least one port which is capable of auto-negotiation to select between half duplex and full duplex working on a link to which the port is connected, said device including:

means for monitoring the existence of late collisions between packets on said link;

means for monitoring the existence of packet fragments on the link; and monitoring means for detecting and correcting for a duplex mismatch on the link partner, said monitoring means being operative;

to determine whether there are any late collisions and in the absence of a detection of fragments to configure the port from a half duplex mode to a full duplex mode.

2. A device according to claim 1 wherein said monitoring means is operative to detect the presence of fragments when said port is in full duplex mode.

3. A method of controlling a network device operating in an Ethernet packet-based communication system, the network device having at least one port which is associated with an auto-negotiation state machine, the method comprising:

monitoring for the existence of late collisions and packet fragments on a link connected to said at least one port; and configuring the port from half duplex working to full duplex working when late collisions are detected in the absence of fragments.

4. A method according to claim 3 and further comprising:

monitoring for the presence of fragments while the port is working in full duplex; and reconfiguring the port to half duplex working when fragments are detected during full duplex working of said port.

* * * * *